May 8, 1923.
W. L. SCHELLENBACH
HORIZONTAL BORING MILL
Filed April 28, 1919     12 Sheets-Sheet 5
1,454,190
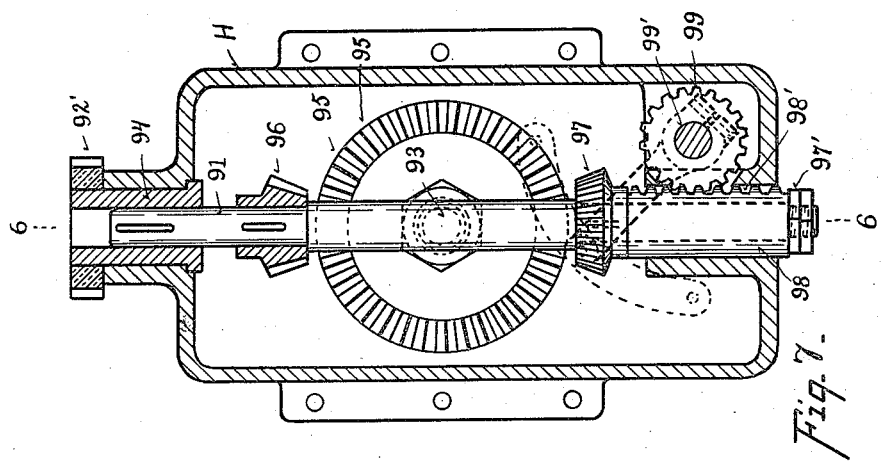
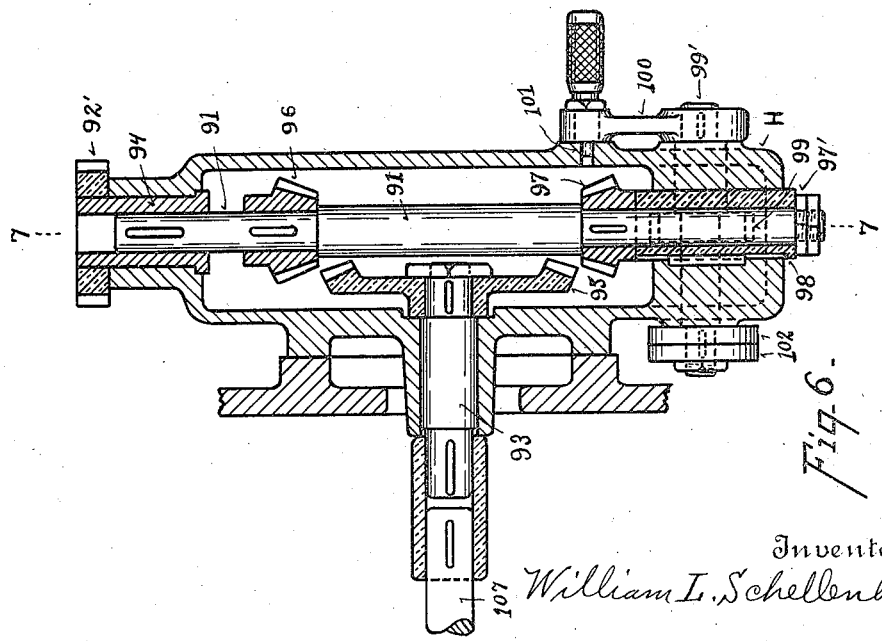
Inventor
William L. Schellenbach
By C. W. Miley.
Attorney

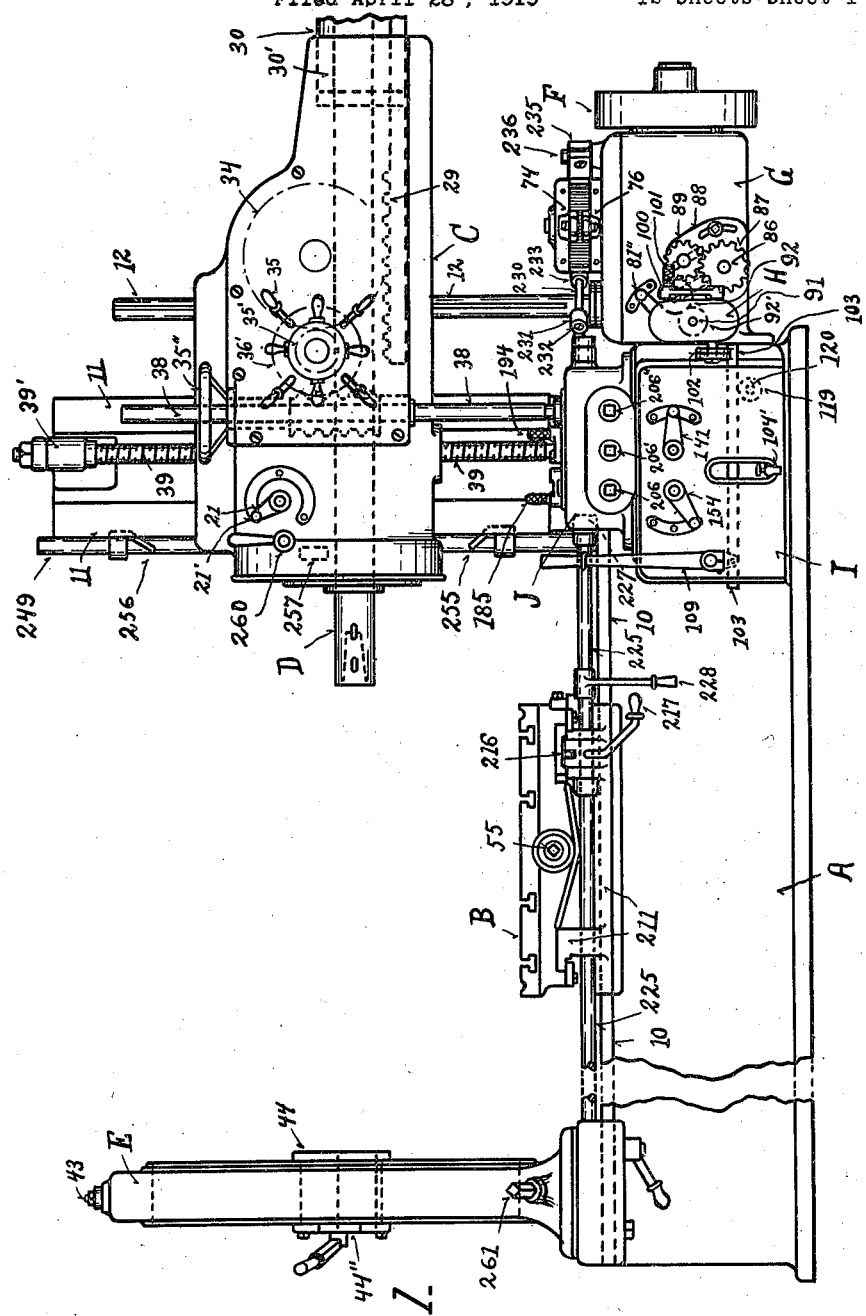

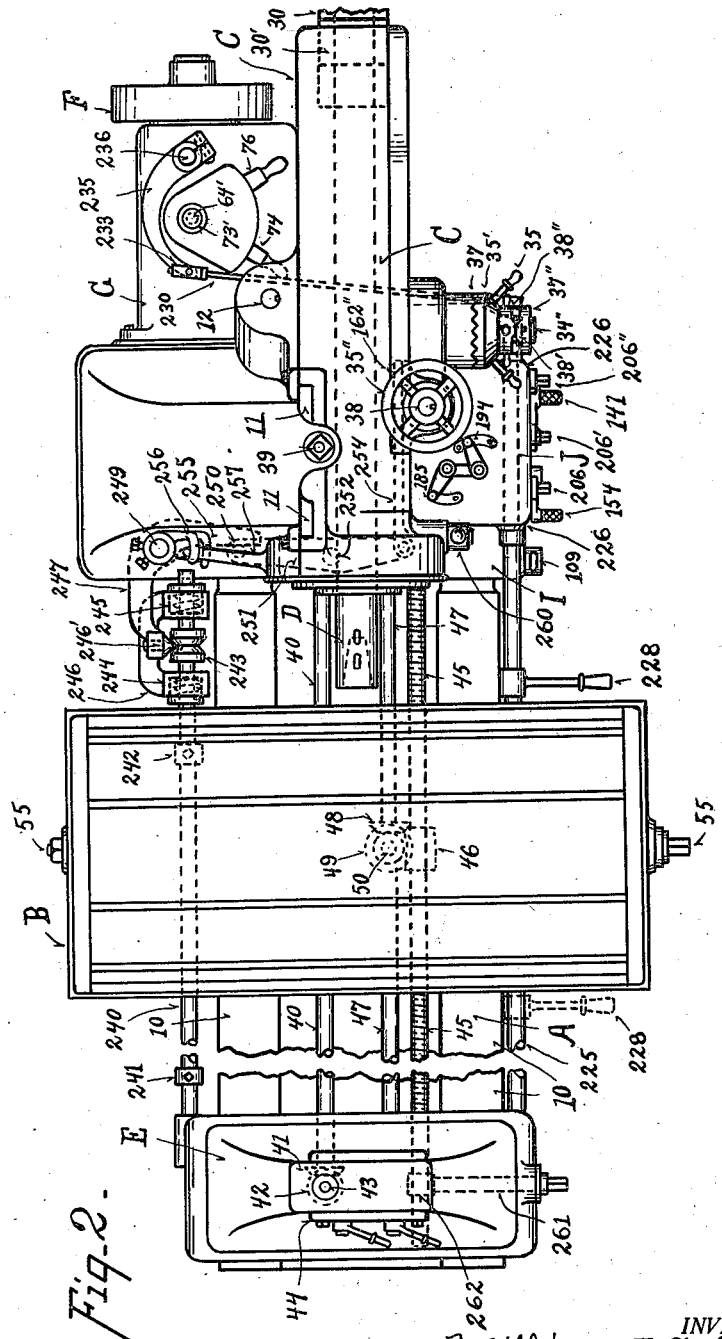

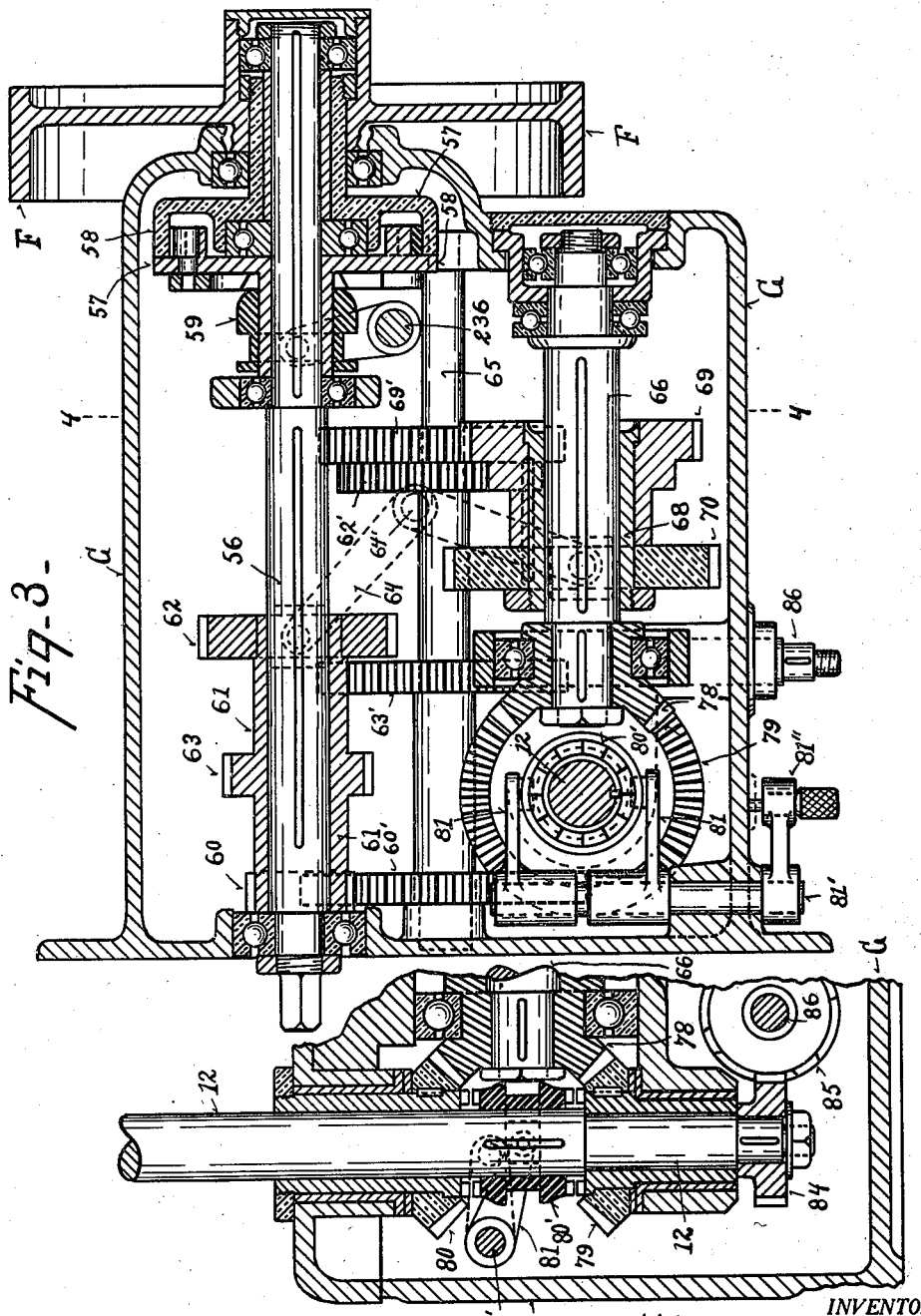

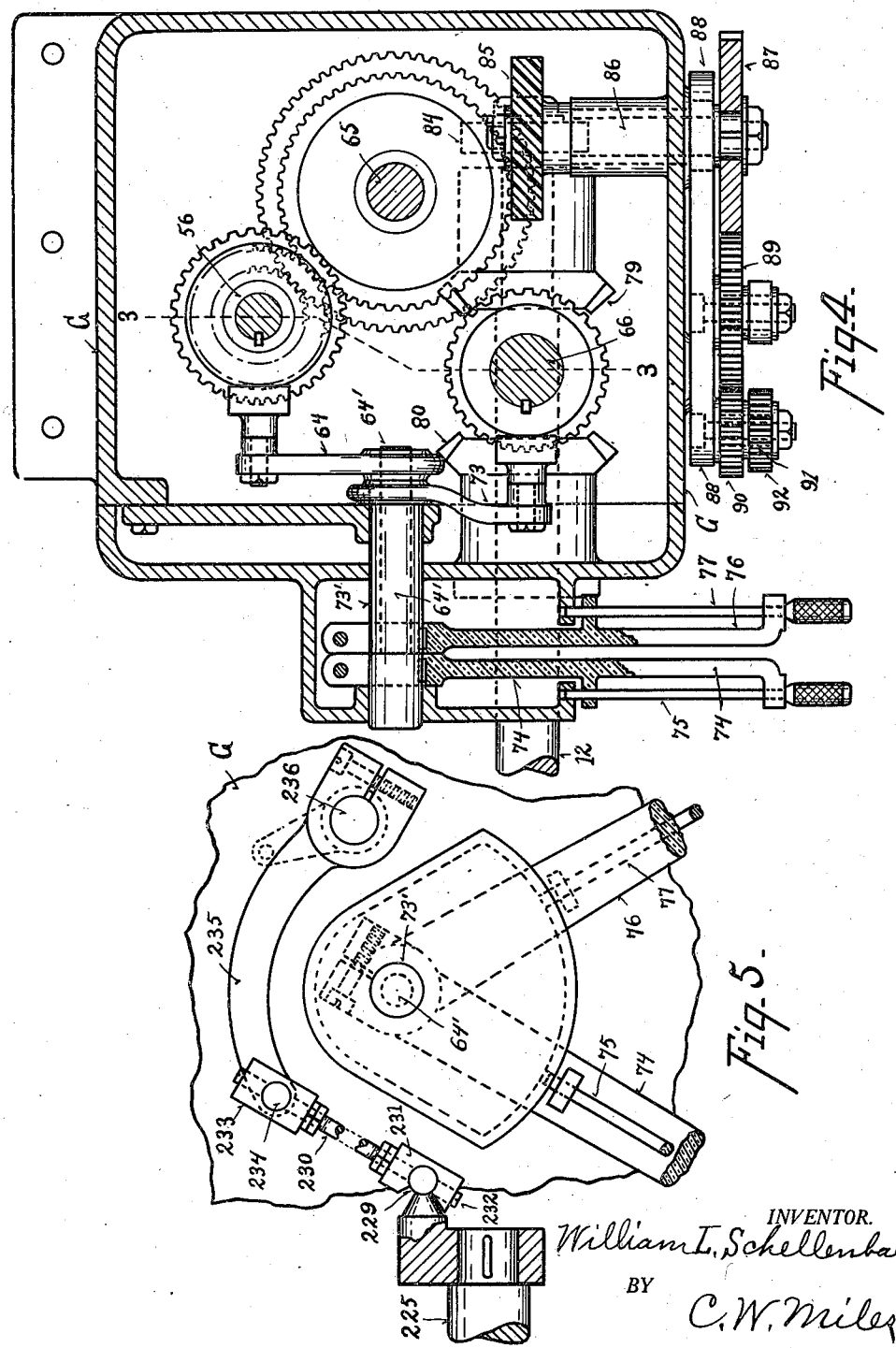

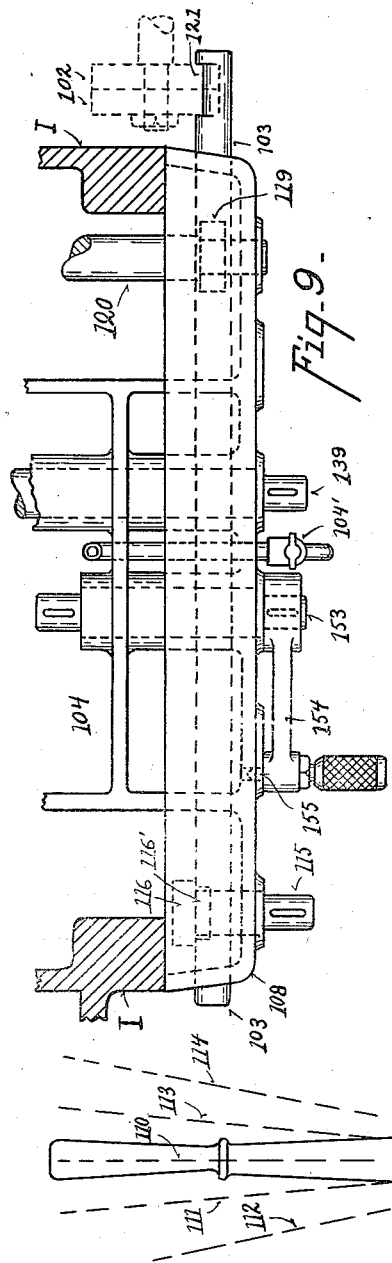
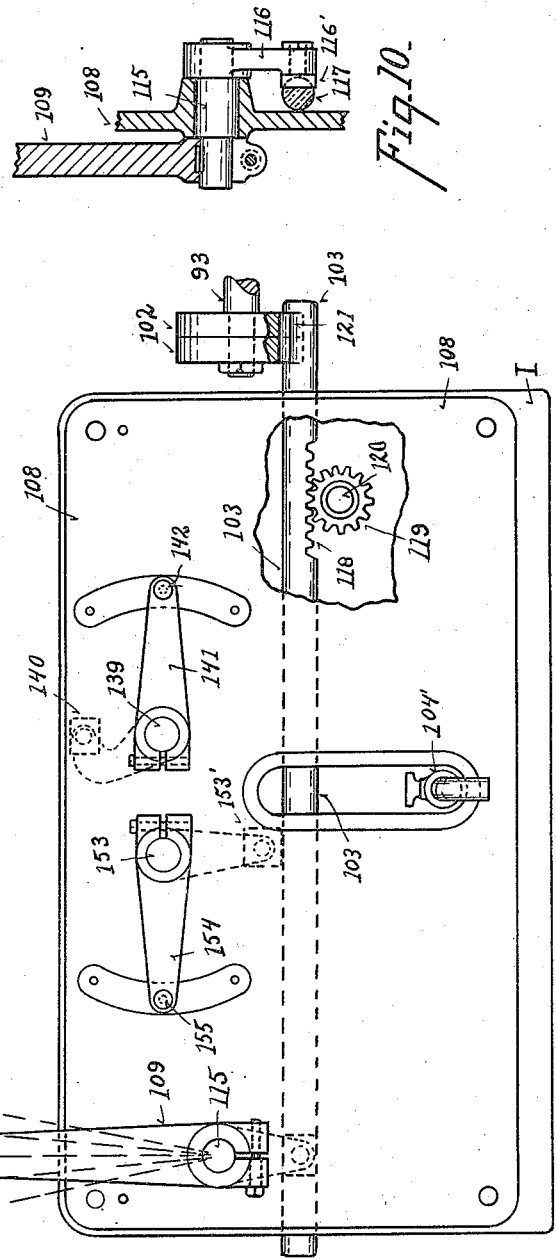

May 8, 1923.
W. L. SCHELLENBACH
HORIZONTAL BORING MILL
Filed April 28, 1919     12 Sheets-Sheet 7
1,454,190
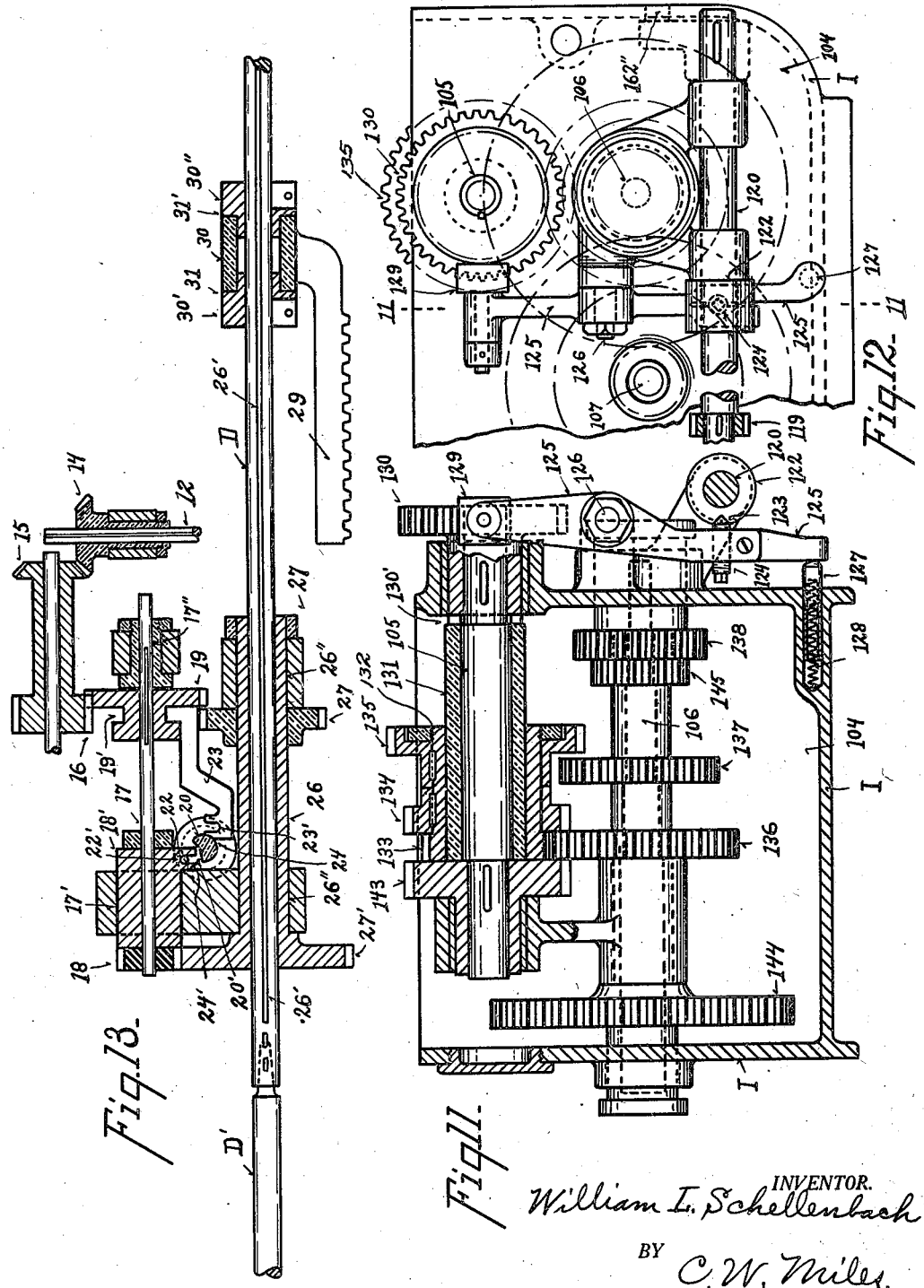
INVENTOR.
William L. Schellenbach
BY C. W. Miley,
ATTORNEY.

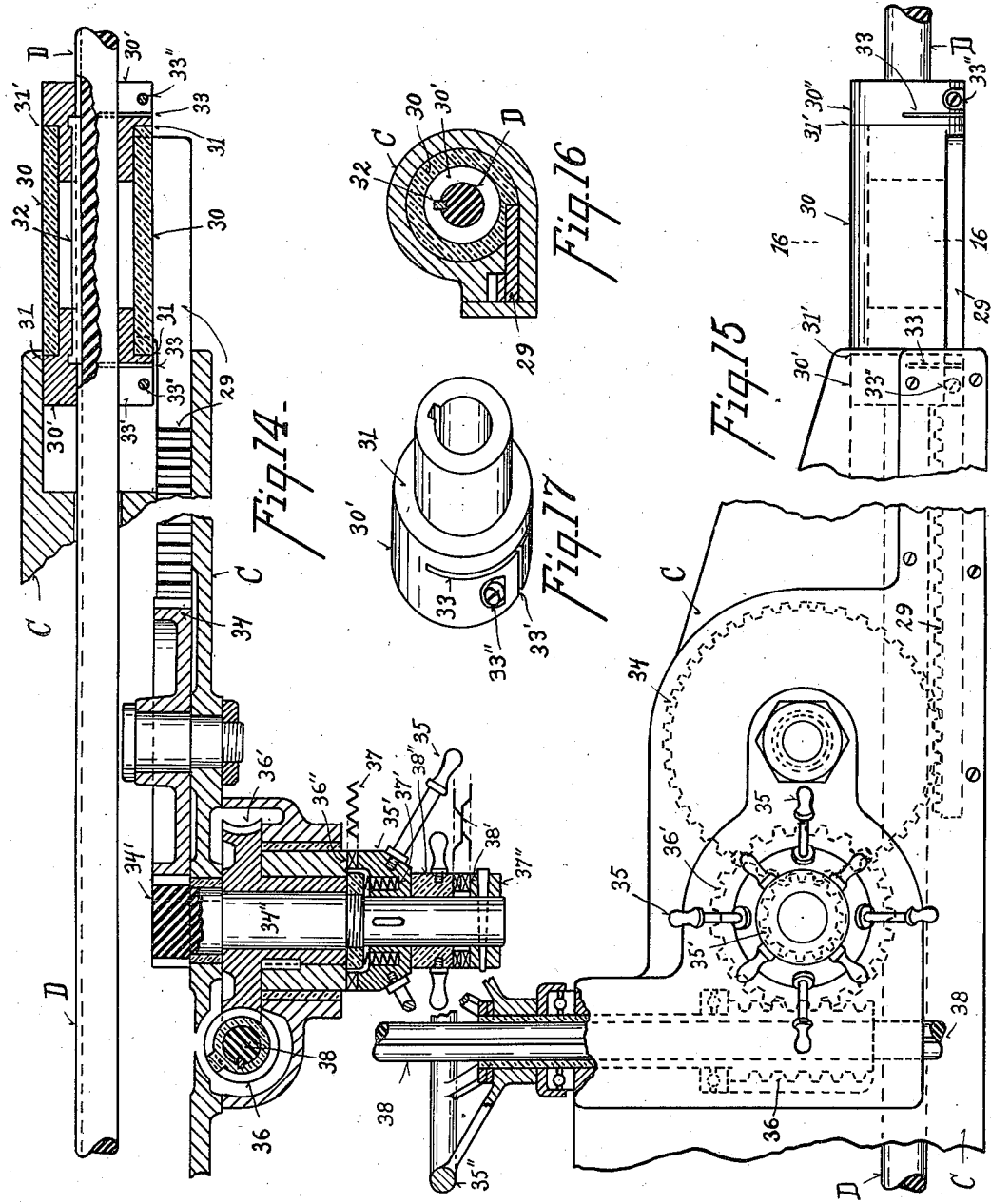

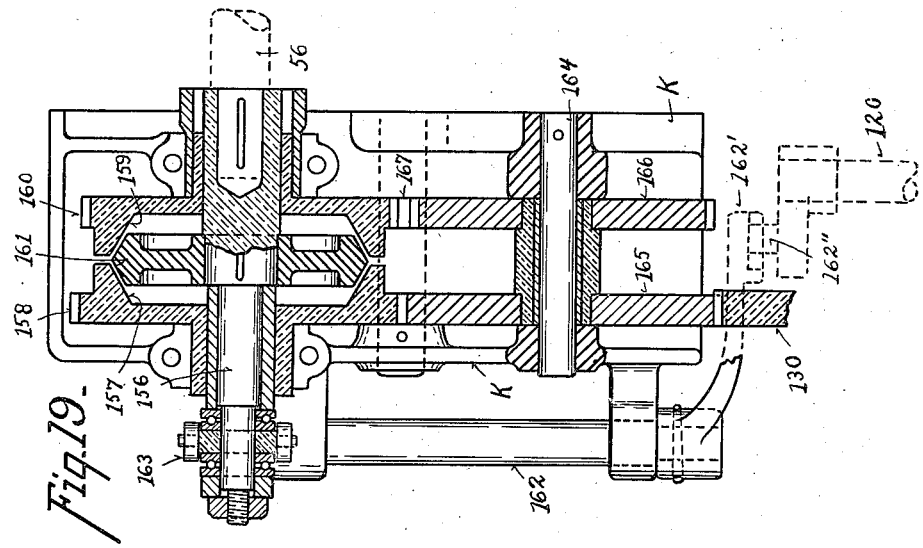

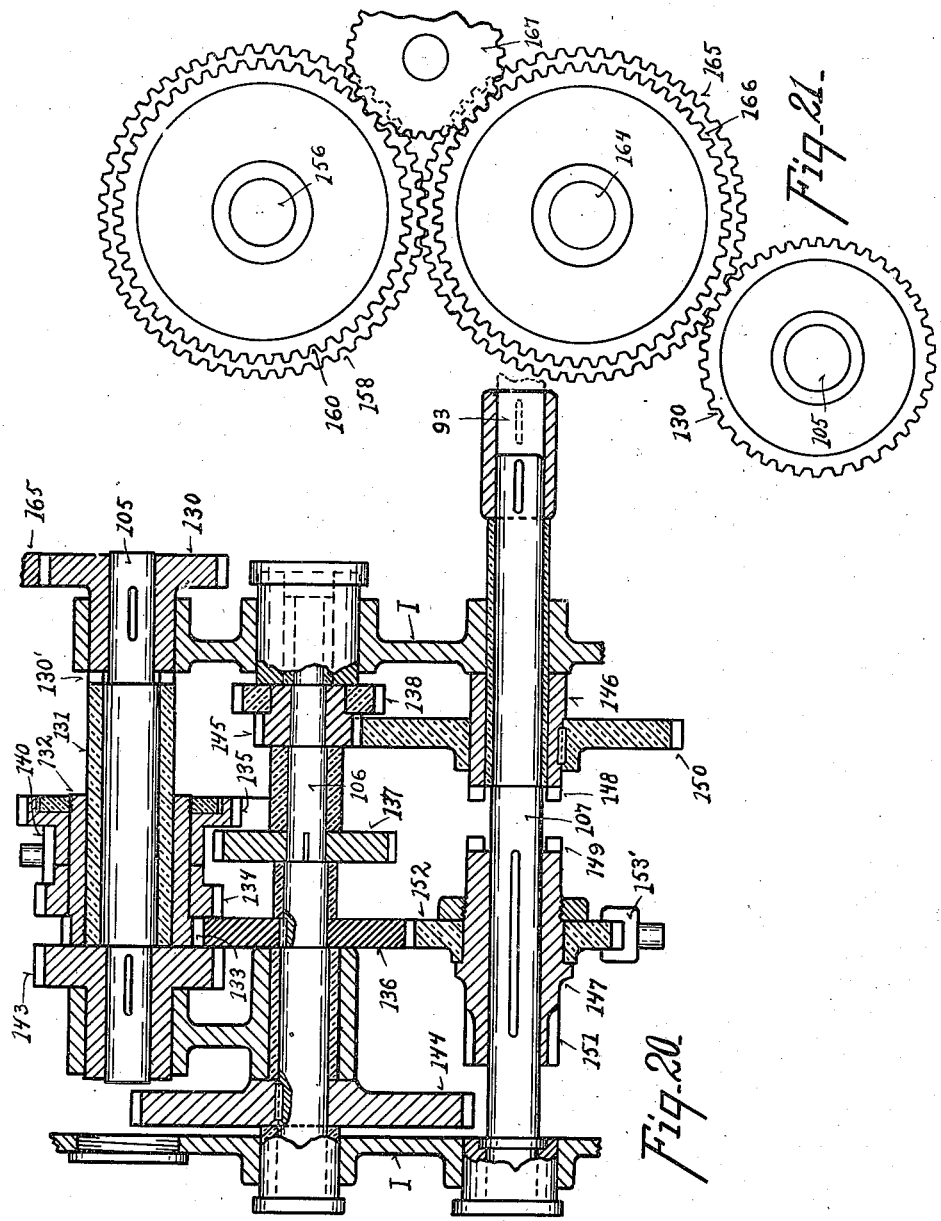

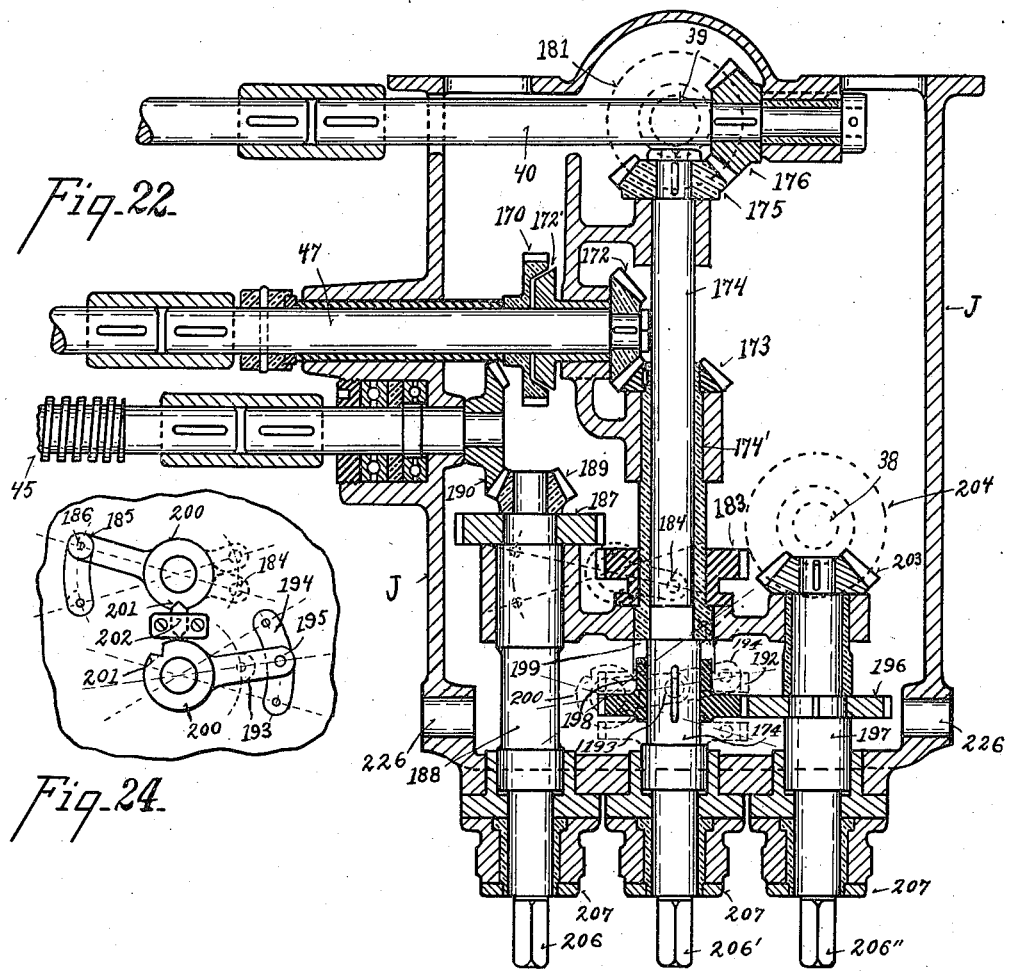
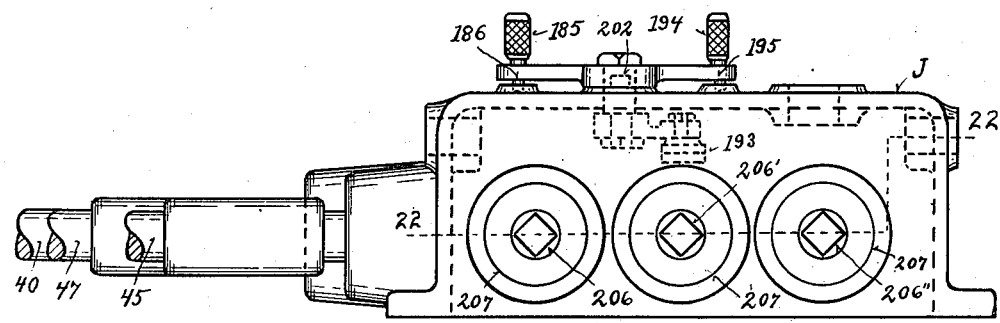

May 8, 1923.
W. L. SCHELLENBACH
HORIZONTAL BORING MILL
Filed April 28, 1919      12 Sheets-Sheet 12
1,454,190
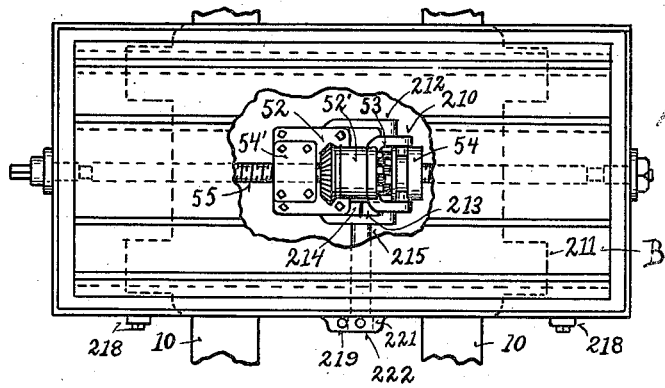
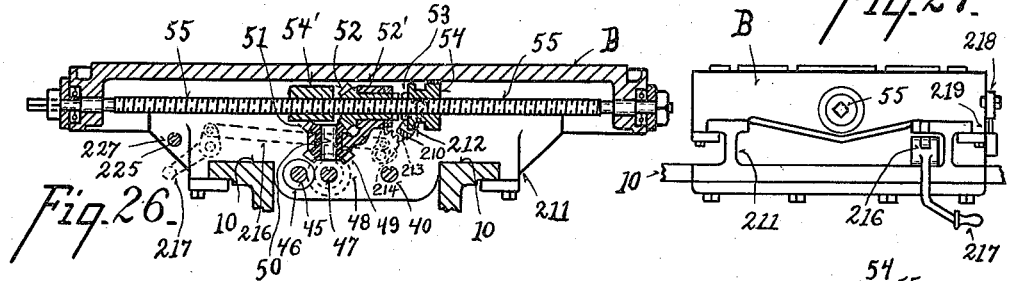
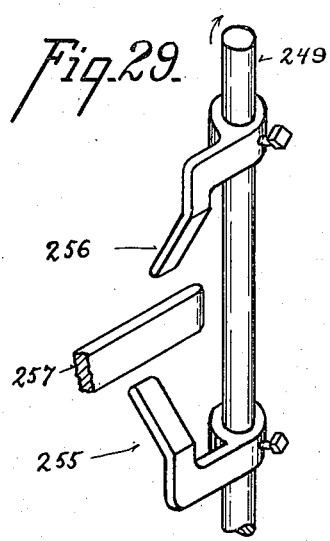
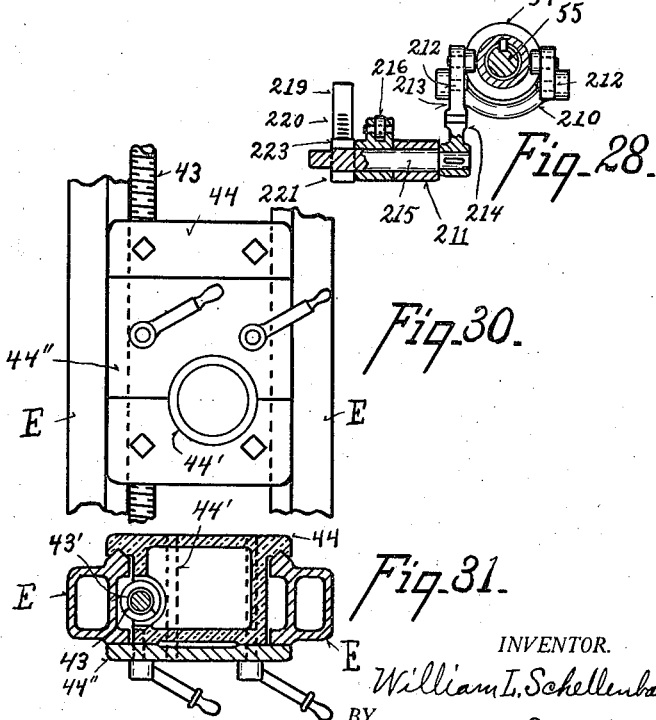
INVENTOR.
William L. Schellenbach
BY C. W. Miles,
ATTORNEY.

Patented May 8, 1923.

1,454,190

UNITED STATES PATENT OFFICE.

WILLIAM L. SCHELLENBACH, OF WYOMING, OHIO, ASSIGNOR TO GIDDINGS & LEWIS MANUFACTURING COMPANY, OF FOND DU LAC, WISCONSIN, A CORPORATION OF WISCONSIN.

HORIZONTAL BORING MILL.

Application filed April 28, 1919. Serial No. 293,330.

*To all whom it may concern:*

Be it known that I, WILLIAM L. SCHELLENBACH, a citizen of the United States, residing at Wyoming, in the county of Hamilton and State of Ohio, have invented certain new and useful Improvements in Horizontal Boring Mills, of which the following is a specification.

My invention relates to improvements in horizontal boring mills. One of its objects is to provide improved arrangement and means to support and feed the tool spindle. Another object is to provide improved speed changing and driving mechanism to feed the work and drive and feed the tool spindle. Another object is to provide improved means to stop the drive and feed from a plurality of positions of the operator relative to the machine and work. Another object is to provide improved means to stop and start the feed mechanism, and to shift from stop to feed or to rapid traverse and in opposite directions. Another object is to provide against shifting to rapid traverse in such manner as to be liable to injure the machine or the work. Another object is to provide improved means to shift the spindle feed from high to slow speed or the reverse. My invention also comprises certain details of form, combination and arrangement, all of which will be fully set forth in the description of the accompanying drawings, in which:

Fig. 1 is a front elevation of my improved boring mill.

Fig. 2 is a plan of the same.

Fig. 3 is a sectional detail through the starter box on line 3—3 of Fig. 4.

Fig. 3ª is a sectional detail of the driving mechanism at the lower end of the driving shaft 12.

Fig. 4 is a sectional detail through the starter box on line 4—4 of Fig. 3.

Fig. 5 is a detail of a portion of the starter box and its shifting lever mechanism partly in section.

Fig. 6 is a sectional detail of the feed reversing mechanism taken on line 6—6 of Fig. 7.

Fig. 7 is a sectional detail of the same on line 7—7 of Fig. 6.

Fig. 8 is a front elevation of the feed controller lever and speed changing housing.

Fig. 9 is a detail of a portion of the same in plan.

Fig. 10 is a sectional detail of the controller lever mechanism.

Fig. 11 is a sectional detail through the feed speed changing casing on line 11—11 of Fig. 12.

Fig. 12 is an end view of a portion of the speed changing casing.

Fig. 13 is a diagram illustrating a portion of the spindle driving and feeding mechanism.

Fig. 14 is a sectional detail of a portion of the spindle feeding mechanism.

Fig. 15 is a front elevation of the mechanism illustrated in Fig. 14.

Fig. 16 is a sectional detail on line 16—16 of Fig. 15.

Fig. 17 is a perspective view of one of the spindle feeding collars detached.

Fig. 18 is a side elevation of the traverse feed reversing and clutch mechanism.

Fig. 19 is a vertical section through the same.

Fig. 20 is a diagram illustrating the speed change mechanism of the feed housing I.

Fig. 21 is a diagram of a portion of the traverse feed train.

Fig. 22 is a horizontal section through the feed distributing housing J on line 22—22 of Fig. 23.

Fig. 23 is a front elevation of the feed distributing housing.

Fig. 24 is a diagram of the controller lever mechanism of the feed distributing housing.

Fig. 25 is a plan of the work table with parts broken away to disclose the feed mechanism.

Fig. 26 is a central vertical section through the work table.

Fig. 27 is an end view of the work table.

Fig. 28 is a detail of the work table feed mechanism.

Fig. 29 is a detail of the automatic stop mechanism actuated by the headstock.

Fig. 30 is a plan of the tailstock head.

Fig. 31 is a sectional detail through the same.

The accompanying drawings illustrate the preferred embodiment of my invention in which A represents the main frame provided with horizontal guides or ways 10 along which a work supporting table B is adapted to travel, and also with vertical guides or ways 11 upon which a headstock C is adjustably supported. A spindle D is carried by and rotatable relative to the headstock, being power driven and power fed relative to said headstock. A tail-stock E is supported upon the main frame A and is adjustable along the ways 10. The train of driving mechanism serving to transmit motion at appropriate speeds from the primary belt-pulley or driving element F to rotate the boring-bar or tool spindle D; the headstock and tail-stock adjusting feed; the endwise feed of the spindle; and the work-table longitudinal and cross feeds, together with features incidental thereto, are mounted and housed in a series of boxes or casings preferably independently mounted upon the main frame and comprising a starting box G, a feed reversing gear casing H, a feed change housing or casing I, which also carries a portion of the rapid traverse mechanism, and a feed distributing box J, and traverse reversing and clutch housing K.

A shaft 12 leading from the box G through the head C has splined thereto a miter gear 14 which journals in bearings in the head C and drives a miter gear 15, see Fig. 13, which gear 15 carries with it, and journaled in the head C a spur-gear 16. A shaft 17 is provided with a pinion 18 and a gear 19, and is adjustable endwise in bearings 17' and 17" in the head C. The spindle D has a key seat 26' by which it is splined to a sleeve 26 journaled in bearings 26" in the head C. The sleeve 26 is provided with a high speed driving gear 27 in position to mesh with gear 19, and a slow speed driving gear 27' in position to mesh with the pinion 18 to drive the spindle at slow speed. A hand actuated crank shaft 20 is journaled in head C and provided outside of head C with a hand lever 21 and a spring actuated locking pin 21' to lock said lever at three different positions to head C. Inside the head C shaft 20 is provided with a crank pin 22 which at one portion of its throw engages a recess 22' in a sleeve 18' in which shaft 17 is loosely journaled, but confined endwise, and by means of which sleeve shaft 17 and pinion 18 are moved endwise to engage or disengage the pinion 18 from the slow speed driving gear 27'. As soon as the crank pin 22 leaves the recess 22', it is in position to and enters the recess 23' in the sliding bar 23 to move said bar 23 through another portion of the throw of crank pin 22. The bar 23 engages an annular recess 19' in the hub of the gear 19 to shift the gear 19 endwise on shaft 17 to engage the gear 19 with the high speed gear 27 to drive the spindle D. The shaft 20 has a recess 20' cut therein to permit the forked ends on opposite sides of the recesses 22' and 23' to pass the shaft 20. The cylindrical portion of shaft 20 alternately engages a curved face 24 on the bar 23, and a curved face 24' on the sleeve 18' to lock bar 23 against movement while sleeve 18' is engaged by pin 22, and to lock sleeve 18' against movement while bar 23 is engaged by pin 22. The intermediate position of shaft 22 holds the gear 18 and gear 19 both disengaged from driving relation with the spindle D, so that spindle D may be locked rigidly to head C, or may be fed endwise in head C without rotation of spindle D. One of the bearings 26" is preferably split in order that it may be clamped upon and rigidly hold the sleeve 26 against rotation.

It is designed to interchangeably employ any one of an extended variety of boring-bars D' detachably mounted in a chuck or socket at one end of the spindle D.

A rack-bar 29 slides endwise in guides in the head C and is attached at one end to a sleeve 30 concentric with the spindle D, which has collars 30' and 30" fitted at opposite ends with shoulders 31 and 31' to the sleeve 30. A key 32 locks the collars 30' and 30" together and to the spindle D causing the said collars to rotate with the spindle D relative to the sleeve 30, and providing for movement of the spindle endwise in said collars. The collars 30' and 30" have transverse slots 33 and longitudinal slots 33' cut therein respectively, and are fitted with clamping screws or bolts 33", thereby providing for clamping the sleeves 30' and 30" rigidly upon the spindle D. The rack-bar 29 is engaged by a gear 34 to feed the rack-bar, sleeve 30, collars 30' and 30", and spindle D by hand or by power feed the length of said rack-bar, after which, if a further forward feed is required, the collars 30' and 30" are released from the spindle and fed back to a new point of engagement with the spindle, and then employed to feed the spindle forward another step. This endwise feed of the spindle may be in either direction.

The gear 34 is journaled to the head C and driven by a pinion 34' on the shaft 34". The shaft 34" may be turned by hand through hand levers 35 carried by a hub or collar 35' splined to said shaft and having a limited movement endwise thereon. Shaft 34" may also be driven by power from the feed shaft 38 through a worm 36 splined to shaft 38 and journaled to head C, and which drives a worm-wheel 36' loosely journaled on the shaft 34" and provided with a clutch member 36" of the V-shaped or saw-tooth type indicated diagrammatically at 37 in Fig. 14, to engage a corresponding clutch member carried by the hub 35'. The hub 35' also has recesses in which are mounted springs 37' normally tending to disengage said clutch members. A collar 37" secured to shaft 34" by a pin and having a clutch member with blunt teeth 38' indicated diagrammatically in Fig. 14, is engaged by a clutch member having counterpart teeth carried by a collar 38" loosely journaled on shaft 34" between the fixed collar 37" and the hub 35', and is provided with handles to rotate the collar 38" and thereby engage or release the clutch 36", to enable shaft 34" to be hand or power fed. A hand wheel 35" carried rigidly by the sleeve or stem of the worm 36 provides also for feeding the shaft 34" by hand at a slower rate when the shaft 38 is disconnected from its power feeding mechanism.

A screw shaft 39 extending vertically from the casing J and engaging a nut carried by the head C provides for either hand or power feed of the head C vertically on the ways 11. A shaft 40 extending horizontally from the casing J and driven from the same source as the screw shaft 39 serves to drive a miter gear 41 journaled at the base of the tail-stock. The gear 41 drives a miter gear 42 on a screw-shaft 43 journaled vertically in the tail-stock E and engaging a nut carried by the tailstock head or sleeve 44. Thus the head C and sleeve 44 may be simultaneously elevated or lowered at the same rate of speed by hand or by power.

A screw-shaft 45 projects horizontally from the casing J and engages a nut 46 carried by the saddle of the work-table B to feed the work table in either direction along the ways 10, either by hand or by power. A feed shaft 47 also projecting horizontally from the casing J drives a miter gear 48 journaled to the saddle 211 of work-table B, which gear in turn drives a miter gear 49 on a shaft 50 journaled to the saddle of the work-table. The shaft 50 carries a miter gear 51 which drives a miter gear 52 carried in a bearing 52' secured to the table saddle. A collar 54 is splined to the table cross feed screw 55 and engaged or disengaged from the hub of gear 52 by a clutch 53. The cross feed screw 55 is journaled to the work table B, and threaded through the nut 54', which serves to feed the work-table crosswise of the ways 10 in either direction by power when the clutch 53 is engaged, and by hand when the clutch 53 is disengaged. Said table may also be fed by hand at a slower rate of speed by applying a wrench to the shaft 206'.

*The starting box.*

I preferably employ a single driving pulley rotating at uniform speed, but a cone pulley or other driving element F may be employed. The pulley F is loosely mounted upon a shaft 56 journaled in the frame or casing of the starter box G. Clutch members 57 and 58 engaged and disengaged by a clutch shifter element 59 serve to engage the shaft 56 and pulley F. The shaft 56 is also provided with a pinion 60 and gears 62 and 63 all carried by a sleeve 61 splined to and adjustable endwise on the shaft 56. A shifting lever 64 carried by shaft 64' actuated by a hand lever 74 serves to adjust the sleeve 61 endwise on shaft 56. A shaft 65 is also journaled in casing G parallel to shaft 56, and carries rigidly thereon a series of gears 60', 62', 63', and 69'. The gears 60 and 60' may be engaged to drive shaft 65, also gears 63 and 63', and also gears 62 and 62'. A shaft 66 is journaled in casing G parallel to shafts 56 and 65, and provided at one end with a miter gear 78. A sleeve 68 carrying gears 69 and 70 is splined to and adjustable endwise on shaft 66. A shifting lever 73 carried by a tubular shaft 73' concentric with the shaft 64', is actuated by a hand lever 76 to enable the sleeve 68 to be shifted endwise of shaft 66 to engage gear 69 with gear 69' or gear 70 with gear 62'. A locking member 75 enables the hand lever 74 to be locked to its adjusted position relative to casing G, and a locking member 77 enables the hand lever 76 to be locked in a similar manner. The locking members 75 and 77 are omitted from Fig. 2.

The shaft 12 is journaled at one end in the casing G, and has loosely mounted thereon within the casing G miter gears 79 and 80, which are continuously engaged by the miter gears 78. Intermediate of the miter gears 79 and 80 on the shaft 12 is a clutch member 80' splined to and adjustable endwise on shaft 12, by means of shifting lever 81 mounted upon a shaft 81' journaled in the casing G and provided outside of the casing G with an actuating lever 81". The clutch member 80' serves to clutch either gear 79 or gear 80 to the shaft 12, and hence to enable the shaft 12 to be driven in either forward or reverse direction at a variety of different speeds from the starter box G, and therefrom to rotatably drive the spindle D at a variety of different speeds.

Also mounted upon the shaft 12 within the casing G is a spiral gear 84 which drives a spiral gear 85 on the shaft 86, on which is also rigidly mounted a gear 87 outside the casing G. A tumbler frame 88 is pivotally mounted on the casing G concentrically with the shaft 86 and provided with a plurality of change gears 89 and 90 for instance, adjustable on tumbler 88 and interchangeable with other change gears thereon to drive a sleeve 91 carrying the gears 90 and 92. The gear 92 meshes with and drives gear 92' journaled in the reversing box or casing H, and thus provides for a wide variation in speed ratio between the shaft 12 which rotates the spindle and the gear 92' which is interposed

The feed reversing mechanism.

The feed reversing mechanism comprises a casing H, preferably constructed as a separable unit and detachably mounted upon the main frame A. Within the casing H are shafts 91 and 93 journaled transversely to each other. The gear 92' is located exteriorly of the casing H at one end thereof, and the hub 94 of said gear is journaled in the casing H and is bored to form a bearing for one end of shaft 91, which is splined to and adapted to move endwise in the hub of gear 92'. The shaft 93 within housing H is provided with a beveled gear 95. Shaft 91 has rigidly attached thereto two beveled gears 96 and 97 each adapted to engage and drive the gear 95, but in reverse directions, by shifting shaft 91 endwise. A sleeve or bushing 98 is splined to casing H and has a rack 98' cut in one side thereof to engage a gear 99 by which the bushing 98 may be shifted endwise. The opposite end of the shaft 91 from the gear 92' journals in the bushing 98 between the hub of gear 97 and a collar 97', and thus provides for shifting the shaft 91 endwise to reverse the direction of rotation of shaft 93 through the beveled gears 95, 96, and 97. The shaft 99' of gear 99 projects through the casing H at opposite ends, and at one end is provided with a hand lever 100 and a locking pin 101. At the opposite end said shaft is provided with interlocking tumblers 102 which are interposed to prevent endwise movement of shaft 103 except when said tumblers, and hence the shaft 91 and gears 96 and 97 are in a predetermined position where injury to the mechanism and work would not occur through shifting of said shaft 103 endwise.

The feed changing mechanism.

Over and above the speed changes provided for in the starting box G and the train therefrom to the reversing mechanism, I provide for a further series of speed changes, quickly adjustable and interposed in the spindle feeding and carriage feeding trains of mechanism, and which are chiefly contained in or carried by the feed changing box or casing I, which casing is detachably connected to the main frame A in position to have its driving mechanism connected with the preceding and succeeding portions of the feed train. I also preferably arrange the casing I so as to constitute a lubricant container or chamber 104 to automatically and continuously supply oil to the moving parts contained therein.

The casing I has three shafts 105, 106, and 107 journaled therein with their axes parallel, and with speed changing gear mechanism thereon connecting said shafts together in driving relations as hereafter specified. Said casing I is also provided with a detachable cap 108 on which is mounted a hand lever 109 which serves to stop, start, and reverse the direction of the several feeds and also to throw in and out of gear a rapid traverse train of gear in either forward or reverse direction.

To accomplish these several purposes the lever 109 has as indicated in Fig. 8 five angular positions of adjustment, a vertical position along the dotted axis 110 in which the feed mechanism is connected in position to make the desired feed; a position inclined to the left hand along the dotted axis 111, in which the feeding train is disengaged; a position still further inclined toward the left hand along the dotted axis 112, in which the rapid traverse train is shifted into operative position to secure a rapid traverse, or retractive feed, in the opposite direction to that of the forward feed, as for instance where the working or forward feed is to the left hand, and the rapid traverse movement is toward the right hand. The position of the beveled gears in the casing H predetermines whether the forward or working feed will be toward the right hand or the left hand.

When the lever 109 is shifted to a position of inclination to the right hand along the dotted axis 113 the feed train is disconnected, and when the lever 109 is inclined further to the right hand along the dotted axis 114, the rapid traverse train is in mesh to secure a rapid traverse movement to the left hand, or in the reverse direction to that when the lever 109 is in the position 112. The shaft 103 and the hand lever 109 are connected so that movement of the lever 109 causes an endwise movement of shaft 103, and the tumblers 102 are in position to limit the endwise movement of shaft 103 and lever 109, depending upon the position of the reversing mechanism in casing H, hence with the shaft 93 rotating to secure a working feed toward the left hand and a rapid traverse in the opposite direction, the lever 109 can only be moved from position 110 to position 112 and back to 110, while with shaft 93 rotating in the reverse direction, lever 109 can be moved only from position 110 to position 114 and back to 110.

The hand lever 109 is mounted upon a crank shaft 115 journaled in the cap 108. A crank arm 116 carried by the shaft 115 carries a shoe 116' which engages in a recess in the shaft or rod 103, which is supported in bearings in the cap 108 to move endwise relative to said cap, and is provided with a rack 118 in mesh with a pinion 119 on a shaft 120, which is journaled in ears on the casing I outside of the oil well thereof. The end of the shaft 103 has a recess 121 cut therein, and by reason of an interlocking engagement of said rod with the tumblers 102, the movement of the lever 109 is limited by the position of said tumblers.

Movement of the rod 103 endwise causes the shaft 120 to rotate and the shaft 120 carries a collar 122 having a recess 123 in which fits a tapered pin or set-screw 124 projecting from and adjustable relative to the shifting lever 125, which is pivotally supported at 126. The lever 125 is yieldingly engaged by a push rod 127 actuated by a spring 128 at one end, and at the opposite end said lever is provided with a slotted shoe to engage the flanges of a gear 130 to shift said gear endwise relative to its shaft 105. The hub of gear 130 is splined to the shaft and is also provided with a clutch member 130' to clutch said gear to a sleeve 131 loosely journaled on the shaft 105. Thus there is a constant tendency for the push rod 127 and lever 125 to hold the gear 130 clutched to the sleeve 131, and thus to transmit feed through the gears carried by the sleeve 131, and also to return or hold the lever 109 in its intermediate position 110, but this can only be attained when the recess 123 and pin 124 are in engagement, or when the lever 109 has returned to its position 110. At other positions of the lever 109 the gear 130 serves to drive the shaft 105, but does not drive the sleeve 131, or transmit motion from said sleeve 131 to shaft 105. When gear 130 is unclutched from sleeve 131, a rapid traverse feed may be transmitted through a separate train to gear 130 and shaft 105.

The sleeve 131 has splined and movable endwise thereon a sleeve 132 on which are three gears 133, 134, and 135, of different diameters, which by adjustment of the sleeve 132 endwise may be respectively engaged with gears 136, 137, and 138 on the shaft 106. A crank shaft 139 having a shifter shoe 140 at one end to engage opposite faces of gear 135 and shift the sleeve 132, and a hand lever 141 and locking pin 142 outside of the casing I see Fig. 8 serves to set the sleeve 132 to drive shaft 106 from shaft 105 at different rates of speed. The shaft 105 also has a gear 143 keyed thereto. The shaft 106 has also gear 144 and 145 keyed thereto. The shaft 107 has a sleeve 146 loosely journaled thereon but confined against movement endwise, and a sleeve 147 splined to and movable endwise thereon. Adjacent ends of said sleeves are provided with clutch members 148 and 149 to clutch the sleeves together. The sleeve 146 has a gear 150 keyed thereto and continuously in mesh with gear 145. The sleeve 147 has a pinion 151 cut thereon and adjustable into position to mesh with gear 144, and a gear 152 adjustable into position to mesh with the gear 136 on the shaft 106. A crank shaft 153 has a slotted shoe 153' engaging the flanges of gear 152 to shift the sleeve 147 to its respective positions, and said shaft 153 outside of casing I is provided with a hand lever 154 and locking pin 155.

The shaft 107 is coupled directly end to end with the shaft 93 of the reversing mechanism in the casing H. The gear 143 transmits motion from the shaft 105 to the feeding mechanism in casing J.

The rapid traverse mechanism.

Located in rear of the casing I is a casing K having a shaft 156 which is coupled directly end to end with the shaft 56 of casing G. Mounted loosely on the shaft 156 are a clutch member 157 having a gear 158 and a clutch member 159 having a gear 160. A clutch member 161 is keyed to shaft 156 so as to move idle therewith for a short distance and to lock respectively with the clutch members 157 and 159 at opposite ends of said idle movement. A rock shaft 162 rotatably mounted relative to the frame or casing K is provided with a forked arm 163 to shift the shaft 156 endwise sufficiently to engage and disengage its clutch members, and at the opposite end of shaft 162 an arm 162' to be engaged by a crank pin 162'' on the shaft 120 is actuated by the shifting lever 109. A shaft 164 journaled in the casing K has keyed thereto a gear 165 continuously in mesh with the gear 158, and a gear 166 which is continuously in mesh with gear 160 through a transmitting gear 167 which provides for driving shaft 164 in either direction from shaft 156. Gear 165 meshing with gear 130 on the casing I serves to transmit motion from gear 165 to gear 130 on shaft 105.

Thus as soon as the shifting lever 109 is moved from its vertical position 110 either to the right or to the left hand, the shaft 120 is rocked causing the pin 124 to be displaced from the recess 123, and the shifting lever moved to unclutch the gear 130 from the sleeve 131. While the shifting lever 109 is moved either to the left or right hand to or past the positions 111 and 113, the gear 130 and shaft 105 are not being driven either through the sleeve 131 or through the rapid traverse gear 165, due to the idle period of movement of the clutch member 161, and its shifting lever 162 and the rock shaft 120. When the shifting lever 109 has reached either of the positions 112 or 114, due to the continued rocking movement of the shaft 120, the shifting lever 162 has carried the clutch member 161 past the limits of its idle movement to a position where either one or the other of its clutch faces is engaged and said member being driven at relatively high rate of speed, this motion is directly transmitted through gear 165 or gear 166 to the shaft 164, and thence in the desired direction of rotation to serve as a rapid traverse drive through gear 165 to shaft 105, and thence through gear 143 direct to the mechanism of housing J.

The feed mechanism.

The gear 143 of shaft 105 meshes with and drives a gear 170 on the shaft 47 which shaft occupies a horizontal position between the ways 10 and serves to drive the cross feed of the work table, and also through different branches leading from casing J to feed the spindle endwise, to feed the spindle to different positions of elevation, and to feed the table longitudinally of the main frame, said several feeds being operable separately, and in some instances two or more at the same time.

A clutch member 172' serves to clutch a miter gear 172 to the shaft 47 and said miter gear 172 drives a miter gear 173 on a sleeve 174' adapted to be clutched to shaft 174. The shaft 174 also carries a miter gear 175 which through a miter gear 176 drives a shaft 40 which is journaled horizontally of the main frame A, and at its opposite end has splined thereto a miter gear 41 journaled in a bearing carried at the base of the tailstock. The gear 175 also meshes with and drives a miter gear 181 which is rigidly carried by the vertically mounted feed screw 39, which serves to vertically adjust the headstock C upon the ways 11. Usually the two feed screws 39 and 43 are driven in unison to simultaneously elevate opposite ends of the spindle D.

The sleeve 174' has a spur gear 183 splined thereto and engaged by a shifting member 184 operable by a hand-lever 185 and locking pin 186 to shift said gear 183 endwise into and out of mesh with the gear 187 on shaft 188. On the shaft 188 is a miter gear 189 meshing with a miter gear 190 which drives the horizontally mounted screw shaft 45 which engages a nut 46 carried by the work table B to feed the work table in either direction on the ways 10.

The shaft 174 has also splined thereto a gear 192 which is adjustable by means of a shifting member 193 operable by a hand lever 194 and locking pin 195 to shift said gear 192 endwise of said shaft into and out of engagement with a gear 196 keyed to a shaft 197. The hub of gear 192 has a clutch member 198 and the sleeve 174' also has a clutch member 199, which clutch members when coupled serve to drive the shaft 174 from the gear 173. The gear shifting members 193 and 184 are respectively provided with annular hubs 200 having notches 201 therein, and an interlocking shuttle 202 serves to prevent either of said shifting members being operated except when the other is in a non-interfering or safe position of adjustment, that is so as to be able to use only one of said feeds at a time.

The shaft 197 has a miter gear 203 keyed thereto and said gear meshes with and drives a miter gear 204 on the lower end of the vertically mounted shaft 38, from which the endwise feed of the spindle is effected.

The respective shafts 188, 174, and 197 project through the front of the casing J and have polygonal wrench seats 206, 206', and 206" by means of which each feed adjustment, or adjusting operation may be made by hand by means of a hand wrench. Collars 207 on the shafts 188, 174, and 197 are provided with micrometer scales to facilitate accurate adjustment of said shafts being made.

The work-table feed.

The clutch member 54 is shifted endwise on the feed screw 55 by means of fork 210 pivotally mounted upon centers 212 relative to the work table saddle 211 and provided with shoes to engage the annular recess of said clutch member. Fork 210 carries a gear segment 213 meshing with a gear segment 214 on a rock shaft 215 journaled to the saddle 211 and actuated by means of a link 216 and hand lever 217 from the front of the work table, to shift the clutch member 54 by hand. Said member 54 may also be shifted automatically to release the clutch by means of dogs 218 adjustable along a groove in the edge of the work table B. Said dogs are in position to engage a plunger 219 movable endwise in a recess in the saddle and provided with a rack 220 meshing with gear teeth 221 carried by the shaft 215 which causes fork 210 to rock and releases the clutch member 55 from gear 52, whereupon a spring actuated plunger 222 enters a recess 223 in the segmental gear 221 and locks the fork 210 with the clutch member 55 in released position.

The starting and stop mechanism.

A shaft 225 extends along the front of the main frame and is rotatably supported in bearings 226 in the casing J at one end and in bearings 227 in the work table saddle, and is adapted to be rocked through a portion of a revolution by one or more hand levers 228 keyed or splined thereto, so that said shaft may be rocked from practically any position along the front of the machine. At one end of shaft 225 is a crank arm having a ball 229 at its end. A rod or link 230 has a collar 231 threaded thereto at one end and a screw 232 threaded in the collar so as to engage the ball 229 with a universal joint movement. At the opposite end of rod 230 is a similar universal joint collar 233 engaging a ball 234 at the end of a curved lever 235 attached to the end of shaft 236 outside of the casing G, whereby the clutch actuating member 59 on the shaft 56 inside the casing G may be shifted to engage or disengage the clutch members 57 and 58 to lock or release the pulley F relative to the shaft 56, see Figs. 2, 3, and 5.

*The automatic feed stop mechanism.*

A shaft 240 is supported in a horizontal position upon the main frame so as to have a limited adjustment endwise relative to the main frame. Said shaft has stop members 241 and 242 to be engaged by the work table, and adjustable on said shaft to secure a predetermined range of work-table traverse. A collar 243 having a V-shaped annular groove is held normally in a position of equilibrium and between springs 244 and 245 held in sockets in a supporting bracket 246 with the finger 246' of a bell-crank lever 247 riding in said V-shaped groove. Movement of the shaft 240 endwise in either direction causes the finger 246' to ride up one of the inclined faces of the collar 243, thereby moving the bell-crank lever upon its pivotal axle 249, which is supported in a vertical position in bearings on the main frame A. Movement of the bell-crank lever by the collar 243 causes the opposite end of said bell-crank lever to engage and move a pin 250 carried at one end of a lever 251 which is pivoted at 252 to the main frame. The opposite end of the lever 251 is connected by a link 254 to a crank pin 162'' on the shaft 120, which rocks the lever 125 shifting the gear 130 and thereby disengaging the feed clutch 130' to stop the feed. The vertical shaft 249 is provided with a pair of cam fingers 255 and 256 adjustable thereon and rigidly secured thereto by setscrews. A projection 257 from the head C is adapted to engage one or other of the fingers 255 and 256 at opposite ends of its movement vertically, and to thereby rock the shaft 249 and thus automatically disengage the clutch 130' and stop the feed.

The hand lever 260 on the front of the headstock C serves to lock the headstock C to the vertical ways 11.

The shaft 261 journaled to the tailstock E has a wrench seat outside of the tailstock and a worm wheel 262 at its inner end meshing with the screw shaft 45, by means of which the tailstock may be fed by hand along the ways 10. The tailstock head 44 has a nut 43' engaging the screw shaft 43 to feed the head 44 vertically on the tailstock. A sleeve or bearing 44' is carried by the head 44 to support the outer end of such tool or boring-bar D' as may require support at its outer end. A clamping section 44'' serves by means of clamping levers to clamp the head 44 rigidly to its adjusted position on the tailstock E.

The mechanism herein illustrated and described is capable of considerable modification without departing from the principle of my invention.

What I claim is:

1. A feeding mechanism comprising a reversable feed train, a traverse train, and a controller lever to control the movements of both of said trains, said controller lever having a feeding position, a non-feeding position at each side of the feeding position covering a sufficient range of movement of the controller lever to enable said non-feeding position to be employed as a feed stop position, and a traverse position at the outside of each stop position of the lever.

2. A feeding mechanism comprising a feeding train having a feeding branch and a traverse branch adapted to feed and traverse in either direction, a controller lever having a feeding position, a non-feeding position at each side of the feeding position covering a sufficient range of movement of the controller lever to enable said non-feeding position to be employed as a feed stop position, and a traverse position at the outside of each stop position of the lever, and means connecting said lever to said feeding train to alternately disconnect one branch of said train from driving relation, and after an interval of movement of said lever to connect the other branch thereof in driving relation.

3. A feeding mechanism comprising a feed train, a rapid traverse train, a feed controller lever having a feeding position a non-feeding position at each side of said feeding position, and a rapid traverse position at each side of said feeding position further removed therefrom than said non-feeding positions, and a reversing element in said feeding train having interlocking engagement with said feed controller lever.

4. A driving mechanism comprising a driving shaft, a primary driving element, an interposed clutch mechanism to connect and disconnect said driving element with said driving shaft, a spindle driving train leading from said driving shaft, a traverse train leading from said driving shaft, and a feed train leading from said shaft.

5. A driving mechanism comprising a starter box having a driving shaft, a primary driving element, a clutch interposed between said primary driving element and said driving shaft, a traverse train driven from said driving shaft, a reversable train to rotatably drive a tool spindle, driven from said driving shaft, speed changing mechanism interposed between said driving shaft and said spindle in said spindle rotating train, and a reversable branch train driven from said driving shaft to feed said spindle.

6. A driving mechanism comprising a starter box having a driving shaft, a primary driving element, a clutch interposed between said primary driving element and said driving shaft, a traverse train driven at a relatively high speed directly from said driving shaft, a spindle rotating train having change speed mechanism included therein driven at a relatively medium speed to rotatively and reversably drive a tool spindle, and a feed train reversably driven at a relatively slow speed from said driving shaft to feed said tool spindle endwise in either direction.

7. A driving mechanism comprising a starter box having a primary shaft, a primary driving element loosely journaled on said shaft, clutch members interposed between said shaft and driving element, speed changing mechanism driven from said primary shaft, a shaft driven from said primary shaft through said speed changing mechanism and leading vertically from said starter box to a spindle headstock to rotatably drive a tool spindle journaled in said headstock, and a gear train including speed changing mechanism leading from said vertically mounted shaft to feed said spindle endwise.

8. A driving mechanism comprising a starter box having a primary shaft, a primary driving element loosely journaled on said shaft, clutch members interposed between said shaft and driving element, speed changing mechanism driven from said primary shaft, a vertically mounted shaft having one end journaled in said starter box and driven from said primary shaft through said speed changing mechanism and leading to a vertically adjustable spindle headstock to rotatably drive a tool spindle journaled in said headstock, and a reversable gear train including speed changing mechanism leading from said vertically mounted shaft in said starter box to feed said spindle endwise in either direction.

9. A driving mechanism comprising a starter box having a primary shaft, a primary driving element loosely journaled on said shaft, clutch members interposed between said shaft and driving element, speed changing mechanism driven from said primary shaft, a vertically mounted shaft having one end journaled in said starter box and reversably driven from said primary shaft through said speed changing mechanism and leading to a vertically adjustable spindle headstock to rotatably drive a tool spindle journaled in said headstock, a traverse feed train driven from said primary shaft to effect a traverse feed of said tool spindle endwise at relatively high speed in either direction, and a forward feed gear train including speed changing mechanism and reversing mechanism driven from said vertically mounted shaft to feed said spindle endwise at relatively slow speed in either direction.

10. A driving mechanism comprising a main frame having horizontal ways on which a work-table is adapted to be fed horizontally and vertical ways on which a spindle headstock is adapted to be fed vertically, a starter box mounted rigidly on said main frame and provided with a primary driving element, a driving shaft, a clutch interposed between said shaft and primary driving element, a vertically mounted shaft adapted to be driven from said primary driving element through said driving shaft at different rates of speed to reversibly transmit rotary motion from said starter box to a spindle journaled in said headstock, and a feed train including speed changing mechanism and reversing mechanism driven from said primary driving element through said feed shaft to feed said spindle endwise in either direction.

11. A driving mechanism comprising a primary driving element, a primary driving shaft, a spindle driving train driven from said primary driving shaft, a feed train driven from said primary driving shaft, a clutch interposed between said primary driving element and said trains to connect and disconnect said trains from driving relation with said primary driving element, and an actuating member extending substantially the length of the machine and operable from a plurality of positions to actuate said clutch.

12. A driving mechanism comprising a primary driving element, a primary driving shaft, a spindle driving train driven from said primary driving shaft, a feed train driven from said primary driving shaft, a clutch interposed between said primary driving element and said trains to connect and disconnect said trains from driving relation with said primary driving element, and a rock-shaft extending substantially the length of the machine and operable from a plurality of positions to actuate said clutch.

13. A driving mechanism comprising a main frame having horizontal ways and vertical ways, a work table movable on said horizontal ways and a spindle headstock movable on said vertical ways, a starter box carried by said main frame and provided with a primary driving element speed changing mechanism and a shaft to rotatably drive a tool spindle carried by said headstock, a feed reversing housing mounted on said main frame and provided with reversing mechanism froven from said starter box, a feed speed change housing mounted upon said main frame and provided with speed changing mechanism to vary the speed ratio of the feed relative to the spindle rotation, a feed distributing housing carried by the main frame and provided with mechanism to distribute feed through a plurality of branch trains to the work table and tool spindle, a traverse housing carried by said main frame and provided with a reversable traverse train, and a controller lever to selectively shift the feed train and traverse train into operative position.

14. A driving mechanism comprising a main frame having horizontal ways and vertical ways, a work table movable on said horizontal ways, a spindle headstock movable on said vertical ways, a tool spindle journaled in and adjustable endwise relative to said headstock, a starter box carried by said main frame and provided with a primary driving element speed changing mechanism and a vertically mounted shaft to rotatably drive said spindle, a plurality of collars splined to said spindle and adapted to be rigidly clamped thereon, a sleeve loosely journaled upon said collars and provided with a rack bar supported in guides carried by said headstock, a feed train leading from said starter box to a vertically mounted feed shaft, and means carried by said headstock and driven from said vertically mounted feed shaft to engage said rack to feed said spindle endwise.

15. A driving mechanism comprising a main frame having horizontal ways and vertical ways, a work table movable on said horizontal ways, a spindle headstock movable on said vertical ways, a tool spindle journaled in and adjustable endwise relative to said headstock, a starter box carried by said main frame and provided with a primary driving element speed changing mechanism and a vertically mounted shaft to rotatably drive said spindle, a plurality of collars splined to said spindle and adapted to be rigidly clamped thereon, a sleeve loosely journaled upon said collars and provided with a rack bar supported in guides carried by said headstock, a feed train leading from said starter box to a vertically mounted feed shaft, a gear train leading from said feed shaft to said rack bar, and an interposed clutch to enable said rack bar to be fed either by hand or by power through said feed shaft.

16. A driving mechanism comprising a main driving train, a main feed train, a feed driving branch from said main driving train to said main feed train having reversing means included therein, a traverse driving branch from said main driving train to said main feed train, a reversing clutch in said traverse driving branch having a limited idle movement with a clutching and driving position at each end of said idle movement, and a controller lever to alternately connect said driving feed branch and said traverse driving branch to said main feed train, said controller lever utilizing the idle movement of said traverse branch clutch to connect and disconnect said driving feed branch to said main feed train.

17. A driving mechanism comprising a main driving train, a main feed train, a feed driving branch, a traverse driving branch to transmit energy alternately from said main driving train to said main feed train, a controller lever to direct the transmission of energy through said respective branches to said main feed train, reversing mechanism included in said feed driving branch having an interlocking member to limit the movement of said controller lever, and a reversing mechanism included in said traverse branch having an interposed period of idle movement during which said feed driving branch is operatively connected and disconnected from said main feed train.

18. A driving mechanism comprising a main driving train, a main feed train, a feed driving branch including reversing mechanism and clutch mechanism to drive said main feed train from said main driving train, a traverse driving branch including reversing mechanism and clutch mechanism to drive said main feed train from said main driving train through said traverse branch, a controller lever normally and yieldingly held in position to drive said main feed train through said feed driving branch, and means to predetermine the direction of rotation of said traverse driving branch to insure a traverse feed movement complementary to that of the feed driving branch.

19. A driving mechanism comprising a main driving train, a main feed train, a feed driving branch to drive said main feed train from said main driving train having reversing mechanism and a clutch to connect it with said main feed train, a traverse driving branch having reversing mechanism and a clutch to connect it with said main feed train, and a controller lever having interlocking relations with said feed branch and with the respective clutches of said feed and traverse branches to insure complementary movements of said respective branches to feed and traverse in either direction.

20. A driving mechanism comprising a main frame having horizontal ways and vertical ways, a work table movable on said horizontal ways, a headstock movable vertically on said vertical ways, a tool spindle journaled in and movable endwise in said headstock, a main driving train having a branch train to rotatably drive said tool spindle and a branch train to feed said spindle endwise, said feed train including a collar adjustable endwise on said tool spindle and rotatable therewith, a sleeve loosely journaled on said collar and provided with a rack movable in guides on said headstock and engaging a gear of said feed train to feed said spindle endwise.

21. A driving mechanism comprising a main frame having horizontal ways and vertical ways, a work table movable on said horizontal ways, a headstock movable vertically on said vertical ways, a tool spindle journaled in and movable endwise in said headstock, a main driving train and a main feeding train, said feeding train including a branch train to vertically adjust said headstock, a branch to feed said tool spindle endwise, a branch to feed said work table longitudinally of said main frame, a branch to feed said work table transversely of said main frame, and interlocking shifting levers to selectively connect respective branch feed trains to said main feed train.

22. A mechanism comprising a main frame having vertical ways and horizontal ways, a work table movable on said horizontal ways, a headstock movable on said vertical ways, a tool spindle journaled in and movable endwise in said headstock, a main driving train and a main feeding train, a vertically mounted rock-shaft carried by said main frame and provided with fingers to be engaged by said headstock at opposite limits of its movement to rock said shaft, means actuated by said rock-shaft to release a clutch in said feed train, and means actuated by said work table at opposite limits of its movement to also rock said rock shaft and disconnect said feed train.

23. A driving mechanism comprising a main frame having horizontal ways and vertical ways, a work table movable on said horizontal ways, a headstock moveable upon said vertical ways, a tool spindle journaled in and adjustable endwise in said headstock, a main driving train to rotatably drive said tool spindle, said train including a sleeve journaled in said headstock and provided with a high speed gear and a low speed gear, and in which sleeve the tool spindle is splined, a shaft journaled in the headstock and provided with a pinion to mesh with said low speed gear and a gear to mesh with said high speed gear, a shifting lever provided with a crank pin to alternately engage and shift the gear and pinion on said shaft into driving relation with the gears on said sleeve, and a cam carried by said shifting lever to lock the gears on said shaft against displacement when disengaged from said crank pin.

In testimony whereof I have affixed my signature.

WILLIAM L. SCHELLENBACH.